(12) United States Patent
Ho et al.

(10) Patent No.: US 11,925,240 B2
(45) Date of Patent: Mar. 12, 2024

(54) ARTICLE WITH FIBER PATTERN AND METHOD OF MANUFACTURING THE ARTICLE USING AN EMBROIDERY MACHINE

(71) Applicant: NIKE, Inc., Beaverton, OR (US)

(72) Inventors: Fanny Yung Ho, Portland, OR (US); Guillermo Raffaele, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 503 days.

(21) Appl. No.: 16/991,685

(22) Filed: Aug. 12, 2020

(65) Prior Publication Data

US 2021/0100321 A1 Apr. 8, 2021

Related U.S. Application Data

(60) Provisional application No. 62/910,545, filed on Oct. 4, 2019.

(51) Int. Cl.
| | |
|---|---|
| *A43D 8/20* | (2006.01) |
| *A43D 8/06* | (2006.01) |
| *D04H 1/16* | (2006.01) |
| *D04H 1/498* | (2012.01) |
| *D04H 11/08* | (2006.01) |

(52) U.S. Cl.
CPC ............... *A43D 8/20* (2013.01); *A43D 8/06* (2013.01); *D04H 1/16* (2013.01); *D04H 1/498* (2013.01); *D04H 11/08* (2013.01); *A43D 2200/10* (2013.01); *A43D 2200/40* (2013.01); *A43D 2200/50* (2013.01); *D10B 2501/043* (2013.01)

(58) Field of Classification Search
CPC ......... A43B 1/02; A43B 1/04; A43B 23/0235; A43B 23/024; A43B 23/0245; A43B 23/025; A43B 23/026; A43B 3/0078; A43B 3/30; A43D 2200/10; A43D 2200/40; A43D 2200/50; A43D 8/06; A43D 8/20; B32B 2437/02; B32B 5/022; B32B 5/06; B32B 7/09; D04H 1/16; D04H 1/498; D04H 11/08; D10B 2501/043

See application file for complete search history.

(56) References Cited

U.S. PATENT DOCUMENTS

| | | | |
|---|---|---|---|
| 4,207,824 | A | 6/1980 | Swift |
| 4,211,593 | A | 7/1980 | Lochner |

(Continued)

FOREIGN PATENT DOCUMENTS

| | | |
|---|---|---|
| CN | 101058929 A | 10/2007 |
| CN | 201108086 Y | 9/2008 |

(Continued)

*Primary Examiner* — Lynda Salvatore
(74) *Attorney, Agent, or Firm* — Quinn IP Law

(57) ABSTRACT

A method of manufacturing an article may include positioning a first textile sheet against a second textile sheet and reciprocating a single needle of an embroidery machine through the first textile sheet and the second textile sheet, the needle forcing fibers of the second textile sheet through the first textile sheet. The fibers may have terminal ends extending outward of an exterior side of the first textile sheet through which the fibers are forced. A method may include forcing fibers from a second side to an opposite side of a single textile sheet to create a pattern of the fibers on the opposite side. Various articles such as footwear uppers may be manufactured according to the method.

9 Claims, 13 Drawing Sheets

(56) References Cited

U.S. PATENT DOCUMENTS

| | | | |
|---|---|---|---|
| 6,718,895 B1 * | 4/2004 | Fortuna | D05B 19/08 |
| | | | 112/475.19 |
| 6,774,063 B2 | 8/2004 | Bouchette et al. | |
| 9,185,947 B2 | 11/2015 | Spencer et al. | |
| 2012/0272463 A1 | 11/2012 | Crisp et al. | |
| 2014/0048003 A1 | 2/2014 | Farris | |
| 2018/0014678 A1 | 1/2018 | Zafiroglu et al. | |
| 2018/0103724 A1 | 4/2018 | Ho | |
| 2018/0125158 A1 | 5/2018 | Adami et al. | |
| 2019/0125028 A1 | 5/2019 | Bartel et al. | |
| 2019/0223540 A1 | 7/2019 | Cox et al. | |
| 2019/0223541 A1 | 7/2019 | Aceves Tinajero et al. | |
| 2019/0226128 A1 | 7/2019 | Cox et al. | |

FOREIGN PATENT DOCUMENTS

| | | | | |
|---|---|---|---|---|
| CN | 101469491 A | 7/2009 | | |
| CN | 204474943 U | 7/2015 | | |
| EP | 0943716 A1 * | 9/1999 | | D04H 18/00 |
| EP | 1348790 A1 | 10/2003 | | |
| EP | 1348790 A1 * | 10/2003 | | D04B 21/145 |
| FR | 2830542 A1 | 4/2003 | | |
| GB | 746389 A | 3/1956 | | |
| JP | H11172566 A | 6/1999 | | |
| JP | 2004060086 A | 2/2004 | | |
| KR | 100786646 B1 | 12/2007 | | |
| KR | 100894549 B1 | 4/2009 | | |
| KR | 101696636 B1 | 1/2017 | | |
| WO | 2013155081 A1 | 10/2013 | | |
| WO | 2017127441 A1 | 7/2017 | | |

* cited by examiner

US 11,925,240 B2
ARTICLE WITH FIBER PATTERN AND METHOD OF MANUFACTURING THE ARTICLE USING AN EMBROIDERY MACHINE

CROSS-REFERENCE TO RELATED APPLICATIONS

This application claims the benefit of priority to U.S. Provisional Application No. 62/910,545 filed Oct. 4, 2019, which is hereby incorporated by reference in its entirety.

TECHNICAL FIELD

The present disclosure generally relates to an article having a textile sheet with fibers extending through the sheet and to a method of manufacturing such an article using an embroidery machine.

BACKGROUND

Many articles, such as footwear uppers and apparel, include multiple layers of the same or different materials. Each layer may serve a different function in some examples. Manufacturers strive to provide high quality, durable articles in an efficient manner.

BRIEF DESCRIPTION OF THE DRAWINGS

The drawings described herein are for illustrative purposes only, are schematic in nature, and are intended to be exemplary rather than to limit the scope of the disclosure.

DESCRIPTION

Figure 1:
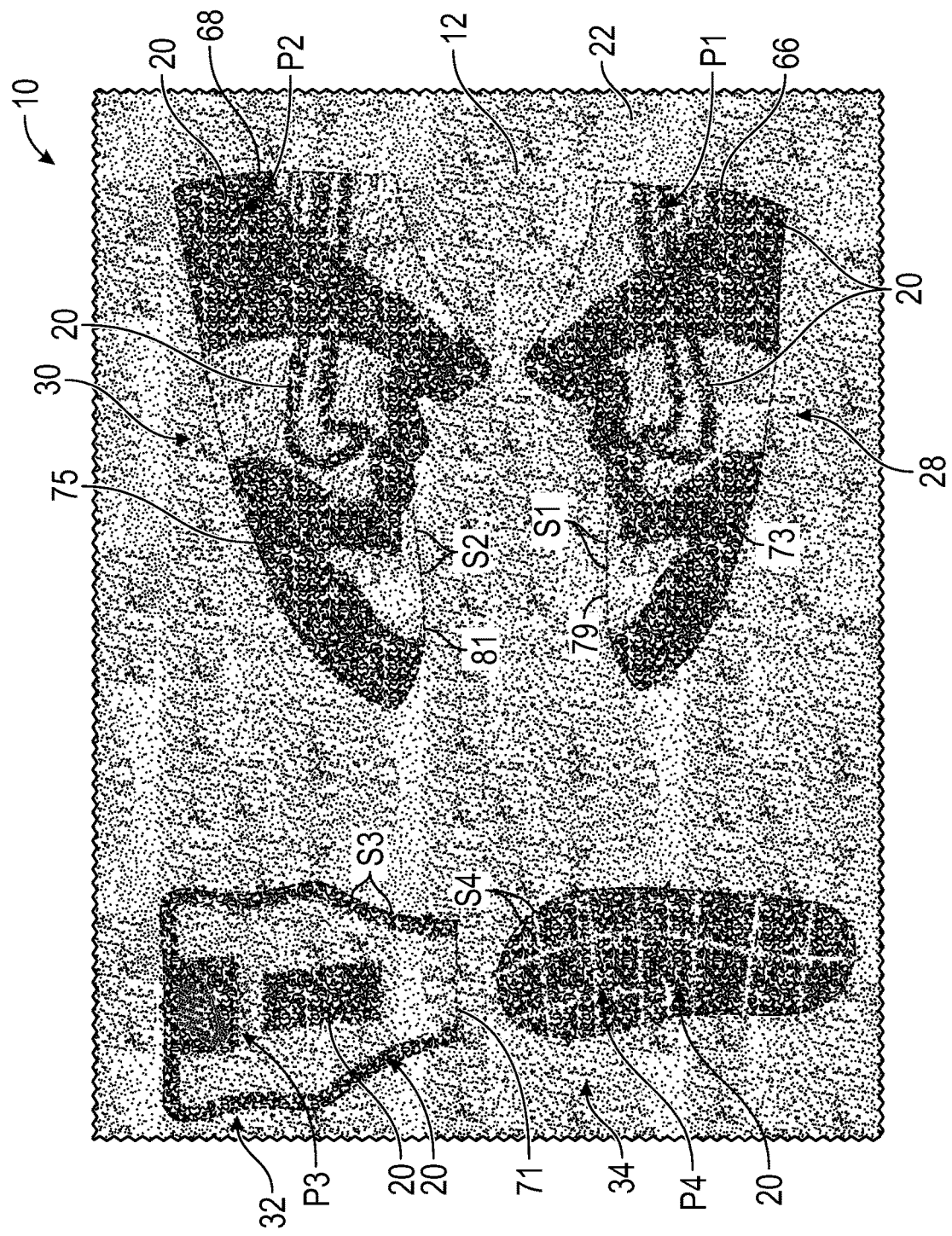
FIG. 1 is a plan view of a first textile sheet having fibers from an underlying second textile sheet extending through the first textile sheet.

A method of manufacturing articles and articles manufactured according to the method as disclosed herein utilize an embroidery machine in a new way to produce a pattern of fibers on a textile sheet where the fibers are forced through the textile sheet with a barbed needle driven by an embroidery machine. The method and articles allow for intricate patterns to be made with the fibers.

In an example, a method of manufacturing an article may include positioning a first textile sheet against a second textile sheet and reciprocating a single needle supported by a needle drive of an embroidery machine through the first textile sheet and the second textile sheet, the needle forcing fibers of the second textile sheet through the first textile sheet so that the fibers are arranged in a predetermined pattern at the first textile sheet. The fibers may have terminal ends extending outward of an exterior side of the first textile sheet.

Because only a single needle is supported by the needle drive, the predetermined pattern of the fibers may be more exact, with finer details than if a cluster of needles were supported together by the needle drive and driven simultaneously through the textile sheets. It should be appreciated that within the scope of the disclosure including the accompanying claims, multiple needle drives may be used, each driving a separate single needle. The use of multiple needle drives may enable the overall predetermined pattern to be produced in less time than if only one needle drive were used. However, at each needle drive, only a single needle is driven, ensuring the fine detail of the pattern.

In an implementation, the single needle may have a notched shaft defining barbs extending toward a tip of the needle. In such an implementation, reciprocating the single needle pushes fibers of the second textile sheet through the first textile sheet. By contrast, in other implementations, the single needle may have a notched shaft defining barbs extending away from a tip of the needle and reciprocating the single needle pulls fibers of the second textile sheet through the first textile sheet. The method may include stitching an outline of the predetermined pattern on the first textile sheet, and reciprocating the single needle may be within the outline. The pre-stitched outline may be helpful, for example, in order for a machine operator to accurately control the needle (and achieve the predetermined pattern, if the needle is not completely automatically moved according to a stored program). The needle is used for its barbs that push or pull the fibers as described. Accordingly, the needle may be unthreaded such that said reciprocating the single needle is without resulting stitching.

In the above example, two sheets which may be textile sheets may be used to form the article. For example, the first textile sheet may be a knit layer and the second textile sheet may be felt, or both of the textile sheets may be felt. In still another example, the first sheet may be leather and the second sheet may be felt. In another example, only a single textile sheet is utilized. More specifically, a method of manufacturing an article may include positioning a single textile sheet on an embroidery machine, the single textile sheet having a first side and a second side opposite from the first side. The second side may be, for example, a fleece side. The method may include reciprocating a single needle supported by a needle drive of an embroidery machine through the single textile sheet, the needle forcing fibers of the second side through the single textile sheet to the first side so that the fibers are arranged in a predetermined pattern at the first side. The fibers may have terminal ends extending outward of the first side of the single textile sheet. The single needle may be unthreaded such that said reciprocating the single needle is without resulting stitching. Whether a single textile sheet is used, two textile sheets are used, or otherwise, the side from which fibers are forced to extend through to the opposite sheet or side may have a debossed area where the fibers are forced through. Areas surrounding the debossed areas may appear to be embossed in comparison.

In such a single textile sheet embodiment, the single needle may have a notched shaft defining barbs extending toward a tip of the needle, and reciprocating the single needle pushes the fibers of the second side through the single textile sheet to the first side. Alternatively, the single needle may have a notched shaft defining barbs extending away from a tip of the needle, and reciprocating the single needle pulls fibers of the second side through the single textile sheet to the first side. In implementations in which the barbs extend away from the tip of the single needle, the method may include stitching an outline of the predetermined pattern on the first side of the single textile sheet prior to reciprocating the single needle, and reciprocating the single needle may be done within the outline so that the fibers of the second side are pulled through the single textile sheet and display the predetermined pattern within the outline on the first side.

An article manufactured according to a method disclosed herein may include a textile sheet having fibers extending through the textile sheet from an interior side of the textile sheet to terminal ends disposed outward of an exterior side of the textile sheet opposite from the interior side. The fibers may be arranged in a predetermined pattern. Because a single needle is supported by the needle drive and is driven through the textile sheet (rather than needles in a cluster), the pattern may include portions of very fine detail. In some implementations, the textile sheet may be a nonwoven textile and the pattern may have one or more portions with a width equal to the diameter of the single needle (e.g., about 0.5 millimeters) if the pattern has only a single drive of the needle at that portion.

In some implementations, the interior side of the textile sheet is a fleece side, and the fibers are fleeced fibers of the textile sheet from the fleece side. Thus, a pattern on one side and fleece on an opposite side are provided with a single textile sheet.

In other implementations, the textile sheet having the fibers extending at the exterior side is an exterior textile sheet, and the article may further include an interior textile sheet disposed against an interior side of the exterior textile sheet. The fibers may be fibers from the interior textile sheet extending through the exterior textile sheet. For example, the exterior textile sheet and the interior textile sheet may be felt sheets. In other implementations, the exterior textile sheet may be a knit layer. In some embodiments, the interior sheet may have a plaid pattern and the fibers of the interior sheet that extend through the exterior sheet display the plaid pattern at the exterior side of the exterior sheet.

In an aspect, the article may be a footwear upper, such as an infant bootie. Footwear uppers and other wearable articles are well suited for manufacture according to a method disclosed herein as aesthetic goals of various patterns may be achieved using textile sheet(s) that serve structural functions of the article (e.g., exterior and interior layers of a footwear upper) without adding an additional layer solely to provide the fibers, which would add cost, stiffness, and bulk.

The above features and advantages and other features and advantages of the present teachings are readily apparent from the following detailed description of the modes for carrying out the present teachings when taken in connection with the accompanying drawings.

Figure 4:
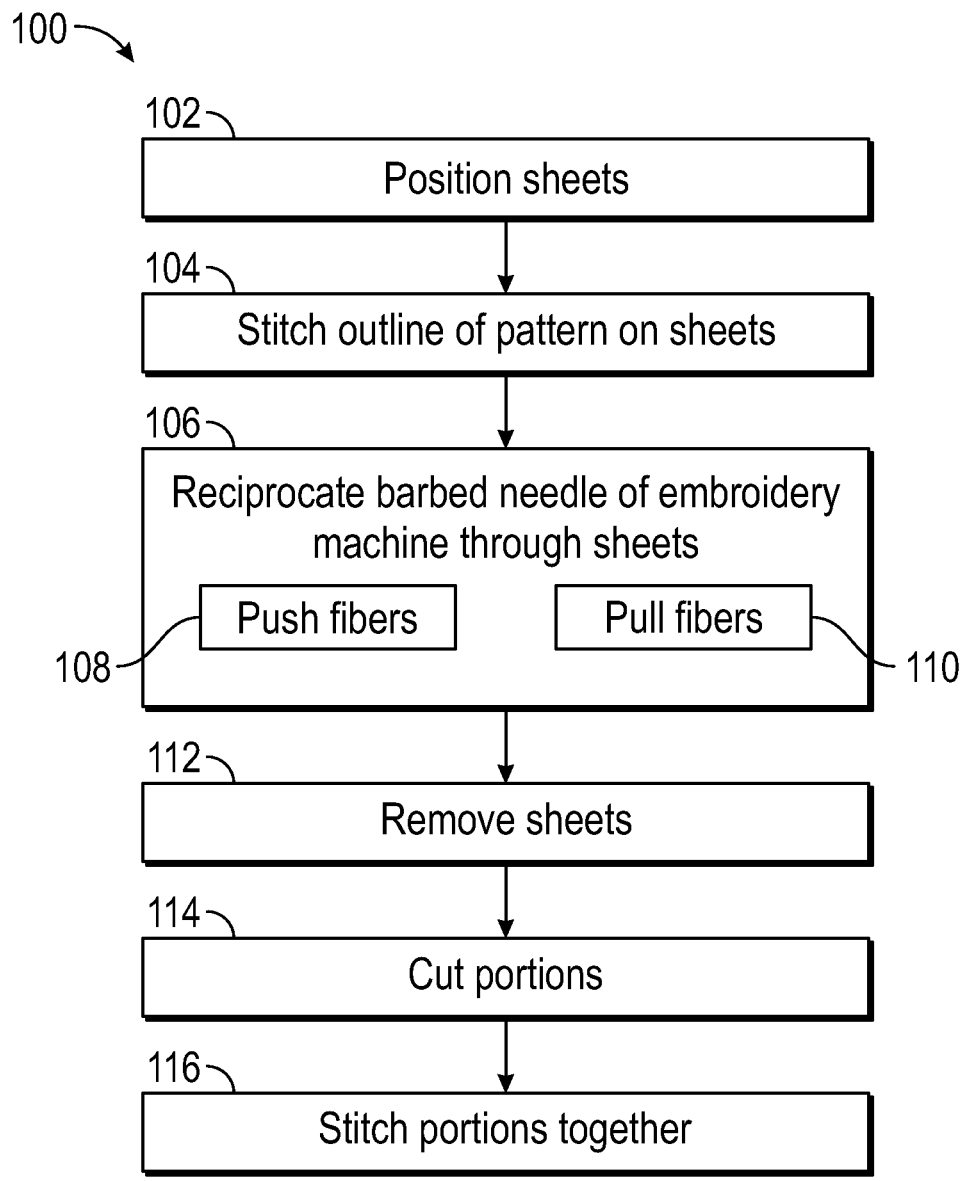
FIG. 4 is a flow diagram of an example method of manufacturing an article with the textile sheets of FIGS. 1-2.

Referring to the drawings, wherein like reference numbers refer to like components throughout the views, FIG. 1 is a plan view of an article 10 at an intermediate stage of manufacture according to a method of manufacturing 100 indicated in FIG. 4. The article 10 in its finished state is indicated as article 10A in FIGS. 14-16 as an article of footwear configured as an infant bootie. In other examples, an article such as a blanket may be represented by article 10 as a finished article. It should be appreciated that many different articles, including other articles of footwear, articles of apparel, and carry bags such as back packs, purses, etc., may be manufactured according to methods disclosed herein.

Figure 2:
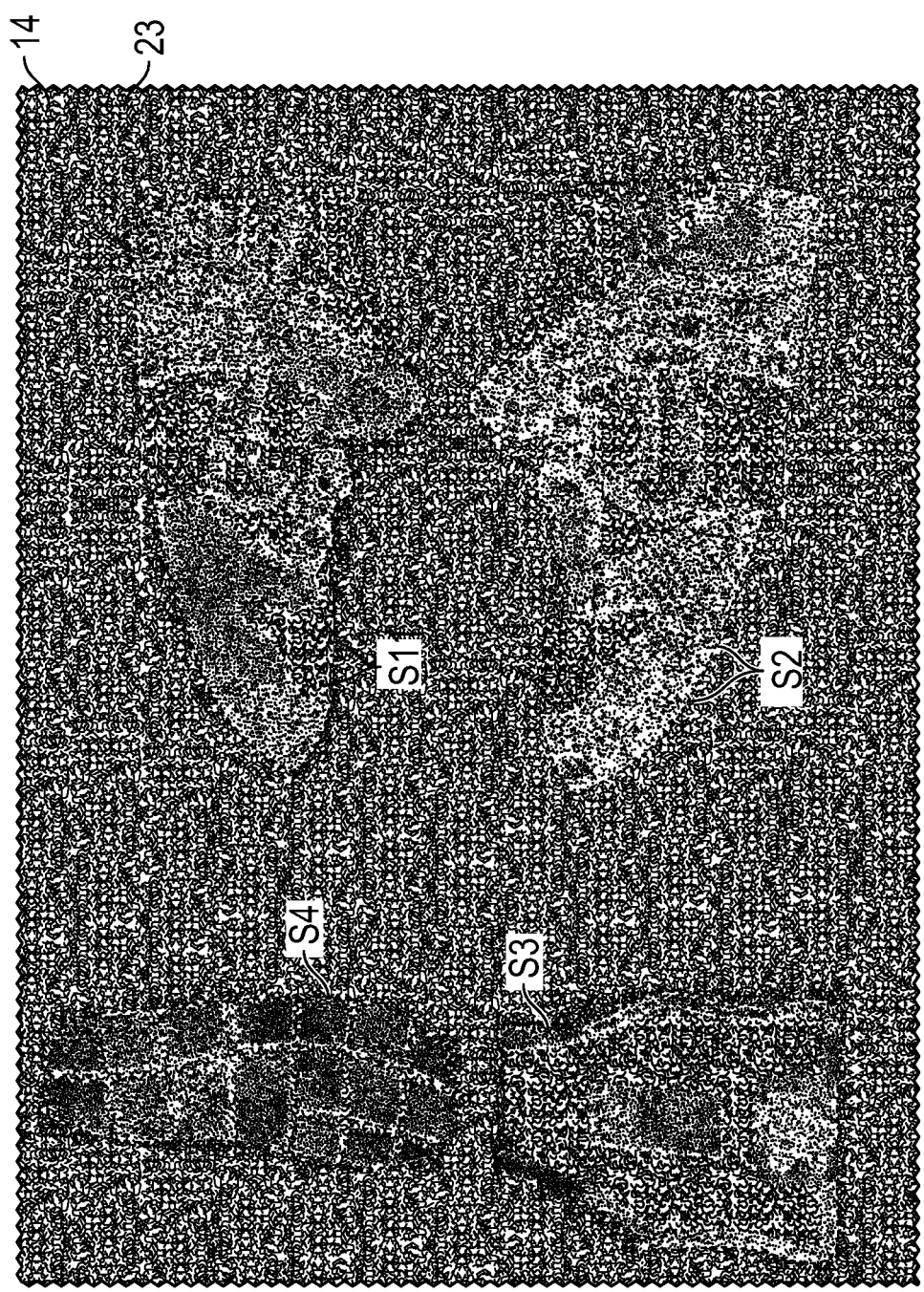
FIG. 2 is a plan view of the second textile sheet from which fibers extend through the first textile sheet of FIG. 1.
Figure 5:
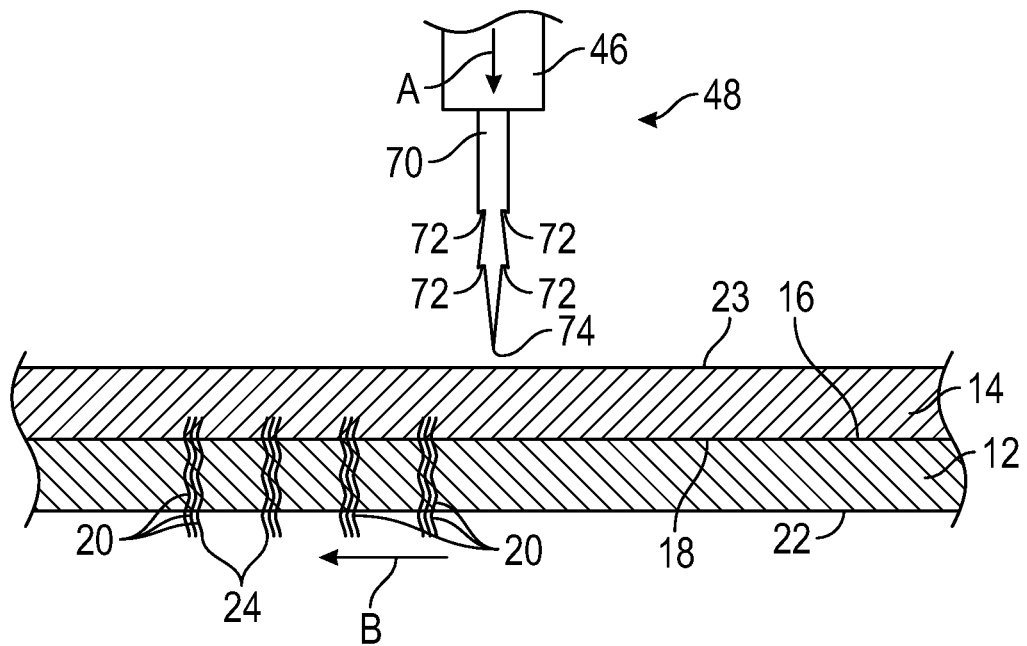
FIG. 5 is a fragmentary cross-sectional view of the textile sheets of FIGS. 1-2 at an intermediate stage of manufacture, illustrating the manufacturing of the article according to the method of FIG. 4 disclosed herein.

The article 10 includes a first textile sheet 12 shown in FIG. 1, and a second textile sheet 14, shown in FIG. 2. The textile sheets 12 and 14 are stacked so that an inner side 16 of the first textile sheet 12 is positioned against an inner side 18 of the second textile sheet 14, as shown in FIG. 5. The first textile sheet 12 may also be referred to as an exterior sheet or an exterior textile sheet, and the second textile sheet may be referred to as an interior sheet or an interior textile sheet. In FIG. 1, fibers 20 of the underlying second textile sheet 14 extend through the first textile sheet 12 so that terminal ends 24 (best illustrated in FIGS. 5 and 6) of the fibers 20 extend outward of and are exposed at the exterior side 22 of the first textile sheet 12, establishing the predetermined patterns shown in FIG. 1. In the embodiment shown, the second textile sheet 14 is a darker color than the first textile sheet 12, so the fibers 20 of the second textile sheet 14 that extend through the first textile sheet 12 and are disposed outward of the exterior side 22 of the first textile sheet 12 are the darker textured areas shown in FIG. 1. In other embodiments, the second textile sheet 14 could be lighter than the first textile sheet 12. Additionally, although the textile sheets 12 and 14 are each initially solid colors in the embodiment shown, in some embodiments, either textile sheet 12, 14 could already be woven or otherwise formed to have a pattern of different colors, so that the fibers of the second textile sheet 14 that extend through the first textile sheet 12 may be a plurality of colors of the second textile sheet 14.

In FIG. 2, the exterior side 23 of the second textile sheet 14 where fibers 20 are forced through the first textile sheet 12 may appear to have slightly different density than surrounding areas (e.g., may appear debossed) or may appear to have a different color than surrounding areas if portions of the first textile sheet 12 are slightly visible through bores created by a driven barbed needle 48 such as that shown and described with respect to FIG. 5. As used herein, a "barbed" needle includes a needle having protrusions that create barbs, as well as a needle having notches in its outer surface that create barbs. Accordingly, the barbs can either protrude outward from an exterior surface of the needle, or can instead comprise an angled surface at the end of a notch in the needle.

In some implementations, the textile sheets 12, 14 may be nonwoven textiles. Either or both of the textile sheets 12, 14 may be a felt material. A felt material may provide fibers that can extend through and remain at the exterior side of the opposite sheet (e.g., the fibers 20 of the second textile sheet 14 maintained at the exterior side 22 of the first textile sheet 12). The density of the textile sheet 12 and the length of the fibers 20 allow the fibers 20 to be effectively held in position, and repeated use of the article 10A will not cause the fibers 20 to slip back through toward the second textile sheet 14 and out of the first textile sheet 12.

In FIGS. 1 and 2, different areas of stitching S1, S2, S3, and S4 establish outlines of the shapes within which the predetermined patterns made by the fibers 20 are disposed. The fibers 20 are forced through the first textile sheet 12 within areas bounded by the outlines of the stitching S1, S2, S3 and S4 to provide predetermined patterns illustrated by the dark areas in FIG. 1. As used herein, patterns are "predetermined patterns" in that they are intentional patterns that are the desired result of driving the barbed needle(s) 48 or 48A through the textile sheets 12, 14, or 312 as described herein, and may result from a stored program 52 in the embroidery machine 44 by which a controller 50 controls the movement of the barbed needle(s) 48 or 48A and the textile sheets. The patterns are generally indicated as P1, P2, P3 and P4 within the respective outlines of stitching S1, S2, S3, and S4. The outlines created by the stitching S1, S2, S3, and S4 are of different portions of the article 10A to be formed from the textile sheets 12 and 14, and include a medial side portion 28, a lateral side portion 30, a tongue portion 32 and a bottom portion 34. The portions 28, 30, 32, and 34 are cut from the assembled textile sheets 12 and 14 by cutting just outward of each outline of stitching S1, S2, S3, and S4, and are sewn to one another to form the article of footwear 10A of FIGS. 14-16 (with the exception of a lace 36, thread 38 used for seam stitching, and a heel pull tab 40 added to the article of footwear 10A).

Figure 3:
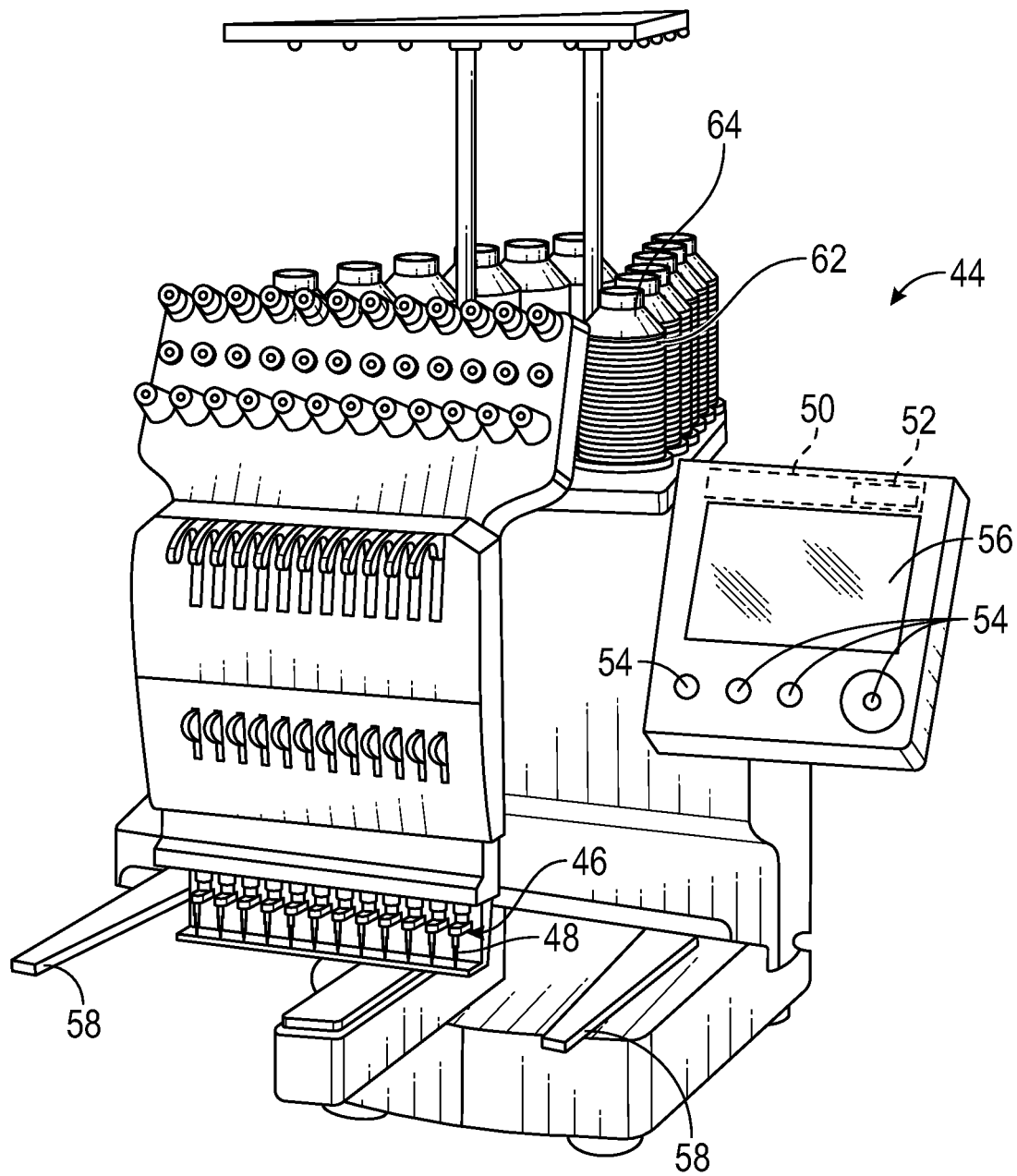
FIG. 3 is a perspective view of an example embroidery machine that may be used in manufacturing the article of FIG. 1.

As shown in FIG. 1, the fibers 20 are arranged in a different specific predetermined pattern P1, P2, P3, and P4 in each portion 28, 30, 32, and 34, respectively. Under the method 100 of manufacturing the article 10A, an embroidery machine is used, such as the example embroidery machine 44 shown in FIG. 3. The embroidery machine 44 is equipped with a needle drive 46 that supports and drives a single barbed needle 48 through the textile sheets 12, 14 (rather than multiple needles in a cluster on the needle drive 46). The embroidery machine 44 may have multiple needle drives 46 (e.g., twelve needle drives 46 are shown in FIG. 3) any of all of which may be used, but each needle drive 46 supports and drives only a single barbed needle 48. Only the right-most needle drive 46 and barbed needle 48 are indicated with reference numbers in FIG. 3. Utilizing an embroidery machine 44 with a single barbed needle 48 per needle drive 46 can achieve predetermined patterns of fibers 20 with finer detail (e.g., precise and dimensionally small or thin details) than if a cluster of needles were used at the needle drive 46 as may occur with a felting machine. For example, the predetermined pattern P3 of the tongue portion 32 shows letters, such as letters of a logo, in fine detail. The predetermined pattern P4 of the bottom portion 34 shows decorative curved lines representing grooves of a sole structure in fine detail. In an example, each letter of the tongue portion 32 and/or each groove of the bottom portion 34 may have a width W (indicated in FIGS. 14 and 16) as small as the diameter of the shaft 70 of the barbed needle 48. At each reciprocation of the single barbed needle 48 through the textile sheets 12 and 14 multiple fibers 20 of the second textile sheet 14 may be forced through the first textile sheet 12, but the number of fibers 20 forced through per reciprocation of the single barbed needle 48 is far fewer in comparison to the number forced through by multiple barbed needles of a felting machine, and the resulting detail achieved is thus finer.

FIG. 3 shows the representative embroidery machine 44 equipped with a controller 50 with a stored program 52 to control operation of the one or more needle drives 46 each supporting a single barbed needle 48. The controller 50 may receive input instructions via electronic or wireless signals generated by an operator accessing input devices such as buttons 54 and/or a display screen 56 to control operation of the one or more needle drives 46. Multiple needle drives 46 may be controlled simultaneously to more quickly impart the predetermined patterns P1, P2, P3, and P4 of fibers 20 of the second textile sheet 14 extending through the first textile sheet 12 as shown in FIG. 1. Alternatively, the predetermined patterns P1, P2, P3, and P4 can be imparted by a single one of the needle drives 46.

A hoop or hooping system may be coupled to the stacked textile sheets 12, 14 and may rest on a transversely movable frame 58 of the embroidery machine 44 to move the textile sheets 12, 14 transversely relative to the driven and repetitively longitudinally (e.g., up and down) oscillating barbed needle 48, as understood by those skilled in the art of embroidery. The embroidery machine 44 is operable to embroider via the needle drives 46 using one or more threads 62, etc., stored on spools 64 when the threads 62 are routed by the embroidery machine 44 to needles on the needle drives 46, but no thread is routed to the barbed needle(s) 48 in carrying out the method 100 so that the barbed needle(s) 48 used may be referred to as threadless.

FIG. 4 is a flow diagram of an example method 100 of manufacturing the article 10A using the embroidery machine 44 of FIG. 3. The method 100 may include step 102, positioning a first textile sheet 12 against a second textile sheet 14 (e.g., positioning the inner side 16 of the first textile sheet 12 against the inner side 18 of the second textile sheet 14 by stacking the textile sheets 12, 14 on one another). Positioning the textile sheets 12, 14 in step 102 may include placing an embroidery hoop or frame (not shown) around the stacked textile sheets 12, 14 to secure them in position relative to one another, as will be understood by those skilled in the art. The stacked textile sheets 12, 14 are positioned on the frame 58 of the embroidery machine 44.

In some implementations, the method 100 may include step 104, stitching an outline of a predetermined pattern on the first textile sheet 12, as indicated by stitches S1, S2, S3, and S4 which outline the eventual predetermined patterns P1, P2, P3 and P4. The stitches S1, S2, S3, and S4 extend through both of the stacked textile sheets 12, 14 and may be made by a threaded needle of the embroidery machine 44 other than the barbed needle 48. In such example, step 104 occurs after step 102 and after the sheets are disposed on the frame 58. Alternatively, the stitching of the outlines may be accomplished by a separate machine prior to disposing the stacked textile sheets 12, 14 on the frame 58 of the embroidery machine 44.

Figure 6:
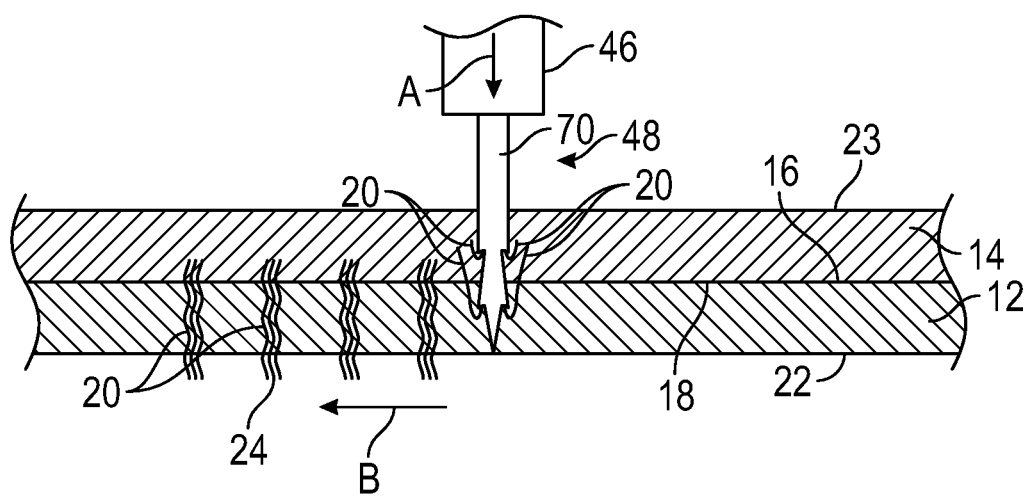
FIG. 6 is a fragmentary cross-sectional view of the textile sheets of FIGS. 1-2 at an intermediate stage of manufacture, illustrating a barbed needle of an embroidery machine pushing fibers from the second textile sheet through the first textile sheet according to the method of FIG. 4.

Next, the method 100 moves to step 106, reciprocating the barbed needle 48 of an embroidery machine 44 through the first textile sheet 12 and the second textile sheet 14, the barbed needle 48 forcing fibers 20 of the interior textile sheet (e.g., the second textile sheet 14) through the exterior textile sheet (e.g., first textile sheet 12). The fibers 20 have terminal ends 24 extending outward of the exterior side 22 of the first textile sheet 12 as shown in FIGS. 5 and 6. Reciprocating the single barbed needle 48 may be within the outline of the stitches S1, S2, S3 and S4. The outlines S1, S2, S3 and S4 may assist an operator operating the embroidery machine 44 by giving a visual indicator of outer bounds of each of the predetermined patterns P1, P2, P3 and P4 so that the fibers 20 of the second textile sheet 14 pulled through the first textile sheet 12 display the pattern P1, P2, P3, and P4 within the first sheet. Alternatively, a program 52 stored on the controller 50 may completely control movement of the barbed needle(s) 48 to such an extent that a stitched boundary is not useful for this purpose, but may be included for decorative purposes and/or for a guide for a subsequent cutting step.

FIGS. 5 and 6 illustrate step 106 with respect to the article 10A of FIG. 1. The stacked textile sheets 12, 14 are disposed with the second textile sheet 14 closest to the driven barbed needle 48. As shown, the barbed needle 48 has a notched shaft 70 defining barbs 72 extending toward a tip 74 of the barbed needle 48. Fibers 20 are caught on the barbs 72 and forced to move with the barbed needle 48 when the barbed needle 48 is moving in the direction of arrow A as shown in FIG. 6. When the barbed needle 48 is withdrawn in the opposite direction, the fibers 20 are released from the barbs 72. In such an implementation, step 106 includes sub-step 108, as reciprocating the barbed needle 48 pushes fibers 20 of the top sheet (e.g., the second textile sheet 14) through the bottom sheet (e.g., the first textile sheet 12) as shown in FIG. 6 with the barbed needle 48 driven in the direction of arrow A (e.g., downward, toward the textile sheets 12, 14). The barbed needle 48 is then withdrawn from the stacked textile sheets 12, 14 in the opposite direction. The stacked textile sheets 12, 14 then translate in the direction of arrow B relative to the barbed needle 48 and needle drive 46 between drive cycles of the reciprocating barbed needle 48. Accordingly, the barbed needle 48 may be unthreaded such that said reciprocating the barbed needle 48 is without resulting stitching. The pre-stitched outlines of the predetermined patterns P1-P4 visible as stitching S1-S4 at the exterior side 23 of the second textile sheet 14 may be helpful, for example, in order for a machine operator to accurately control the barbed needle 48 (if it is not entirely automatically moved according to a stored program 52), as the fibers 20 forming the predetermined patterns P1, P2, P3 and P4 are faced downward on the embroidery machine 44, away from the needle drives 46, and are not readily visible from an operator's perspective, such as the perspective shown in FIG. 3.

Figure 7:
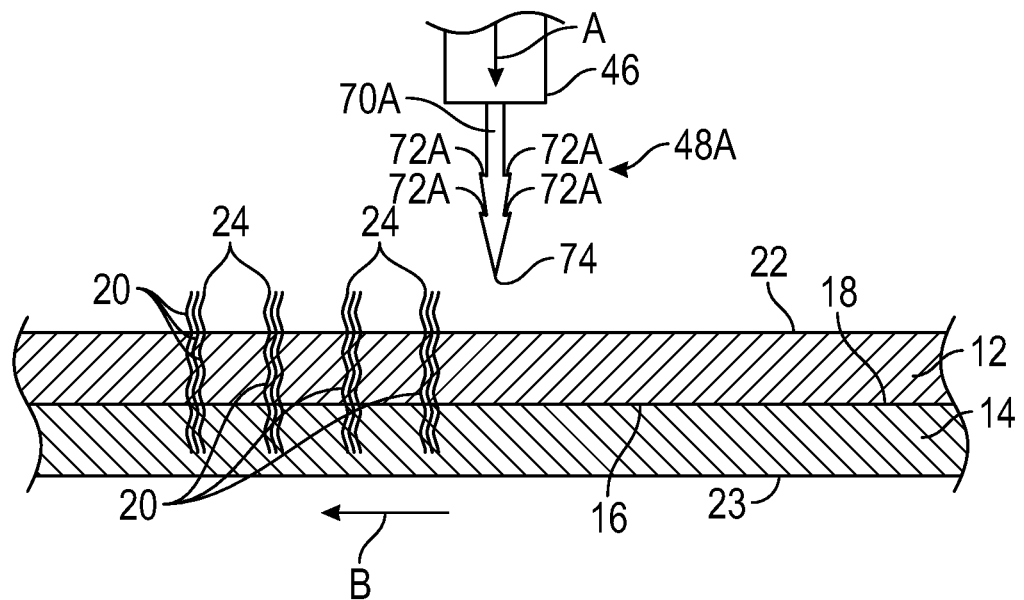
FIG. 7 is a fragmentary cross-sectional view of textile sheets like those of FIGS. 1-2 at an intermediate stage of manufacture, illustrating the manufacturing of the article according to the method of FIG. 4.
Figure 8:
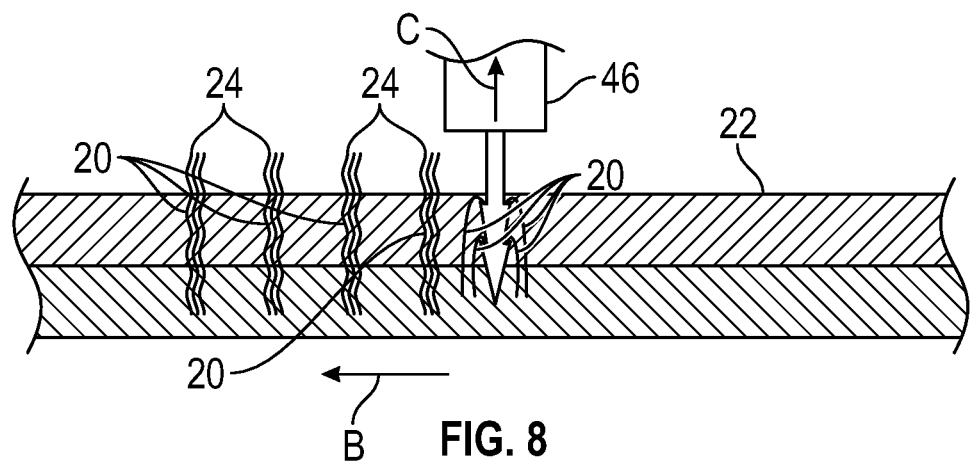
FIG. 8 is a fragmentary cross-sectional view of the textile sheets of FIG. 7 at an intermediate stage of manufacture, illustrating a barbed needle of an embroidery machine pulling fibers from the second textile sheet through the first textile sheet according to the method of FIG. 4.

By contrast, in other implementations as shown in FIGS. 7 and 8, the article 10 is manufactured using a single barbed needle 48A per needle drive 46, where the single barbed needle 48A has a notched shaft 70A defining barbs 72A extending away from the tip 74 of the barbed needle 48A. In such an implementation, fibers 20 are caught on and pulled by the barbed needle 48A when the needle 48A is moving in the direction of arrow C in FIG. 8 (e.g., away from the textile sheets 12, 14), and reciprocating the single barbed needle 48A pulls fibers 20 of the second textile sheet 14 through the first textile sheet 12 (e.g., first driving the barbed needle 48A in the direction of arrow A and then withdrawing it in the direction of arrow C). In such an implementation, positioning the textile sheets 12, 14 in step 102 includes placing the first textile sheet 12 adjacent to the barbed needle 48A and needle drive 46 (e.g., the first textile sheet 12 is stacked on top of the second textile sheet 14), in an opposite orientation in comparison to the embodiment of FIGS. 5-6. Additionally, in such an implementation, step 106 includes sub-step 110, as reciprocating the single barbed needle 48A pulls fibers 20 of the bottom sheet (e.g., the second textile sheet 14) through the top sheet (e.g., the first textile sheet 12) as shown in FIG. 8 as the needle is withdrawn in the direction of arrow C. The stacked textile sheets 12, 14 translate in the direction of arrow B relative to the barbed needle 48A and needle drive 46 between reciprocations (also referred to herein as drive cycles) of the reciprocating barbed needle 48A. The barbed needle 48A pulls the fibers 20 from the second textile sheet 14 through the first textile sheet 12 according to the method 100 of FIG. 4 so that the fibers 20 display the patterns P1, P2, P3, and P4 on the exterior side 22 of the first textile sheet 12.

Following step 106, the method 100 proceeds to step 112, removing the stacked textile sheets 12, 14 from the embroidery machine 44. For some articles, such as a blanket, the method 100 may end at step 112. For other articles, such as the footwear 10A of FIGS. 14-16, the method 100 proceeds to step 114, cutting the portions 28, 30, 32 and 34 out of the stacked textile sheets 12, 14. Cutting may follow along and occur just outside of the stitching S1, S2, S3, and S4 for the respective portions 28, 30, 32, and 34. Apertures 59 (see FIGS. 14 and 15) may also be cut or punched for the lace 36 of FIG. 14.

Figure 14:
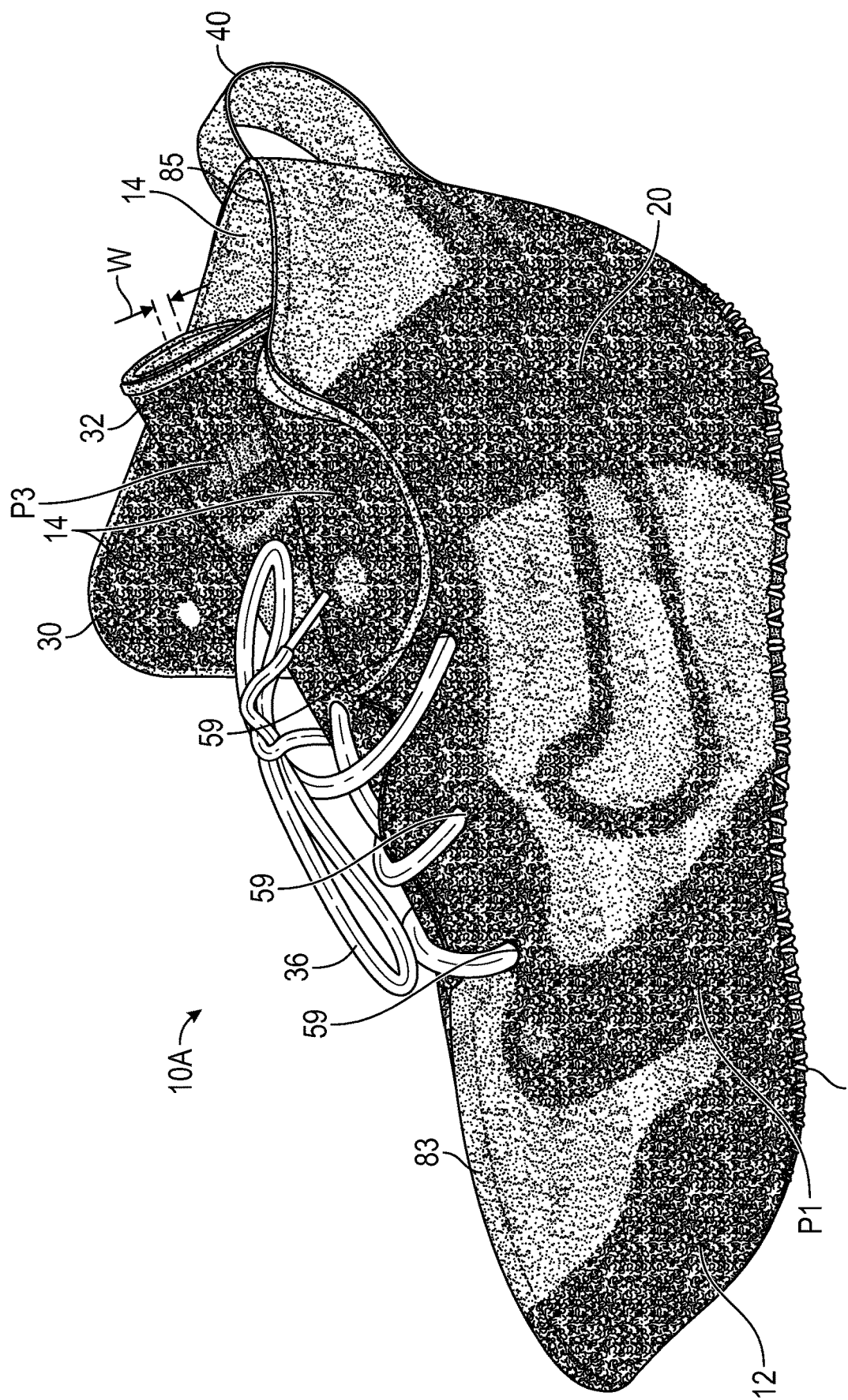
FIG. 14 is a perspective medial side view of an article formed from the textile sheets of FIGS. 1 and 2.
Figure 15:
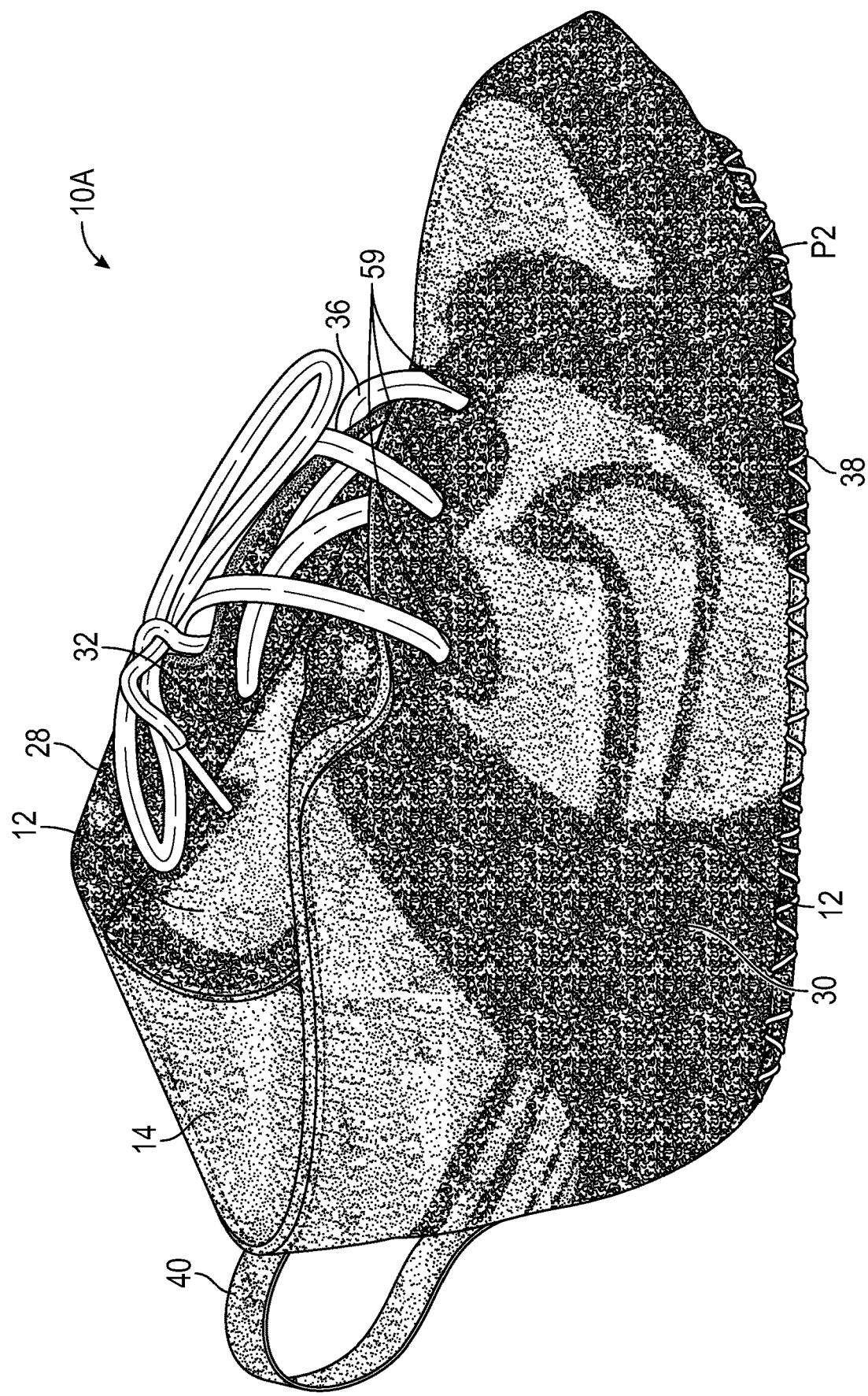
FIG. 15 is a perspective lateral side view of the article of FIG. 14.
Figure 16:
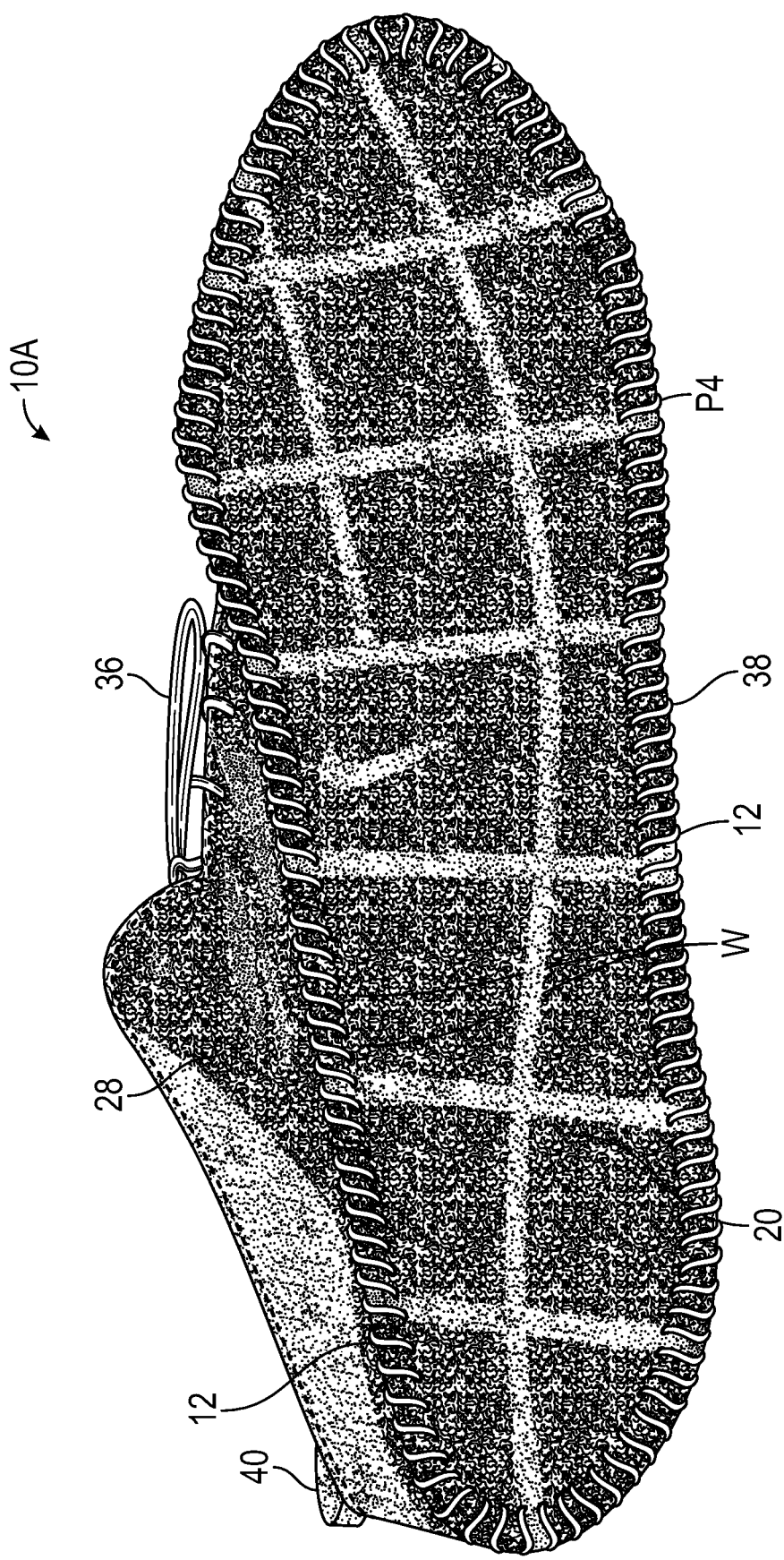
FIG. 16 is a perspective bottom view of the article of FIG. 14.

Once cut, the method 100 proceeds to step 116, and the portions 28, 30, 32, and 34 are stitched together to form the article of footwear 10A. For example, the medial side portion 28 is stitched to the lateral side portion 30 along the respective upper edges 79, 81 (see FIG. 1) to form seam 83 (see FIG. 14) and along the respective rear edges 66, 68 (see FIG. 1) to form a rear seam 85 (a top portion of which is shown in FIG. 14). The tongue portion 32 is stitched at its lower edge 71 to the inside of the portions 28, 30 near the seam 83. Lower edges 73, 75, respectively, of the medial and lateral side portions 28, 30 are stitched to the bottom portion 34 with the thread 38 shown in FIGS. 14-16. The heel pull tab 40 can be stitched to the medial and lateral side portions 28, 30 near the seam 85. The lace 36 can be laced through the apertures 59. As shown in FIGS. 14-16, the predetermined patterns P1-P4 of the fibers 20 of the second textile sheet 14 are visible at the exterior of the article of footwear 10A as the portions 28, 30, 32, 34 are disposed with the exterior side 22 of the cut first textile sheet 12 at the exterior of the footwear 10A.

Figure 9:
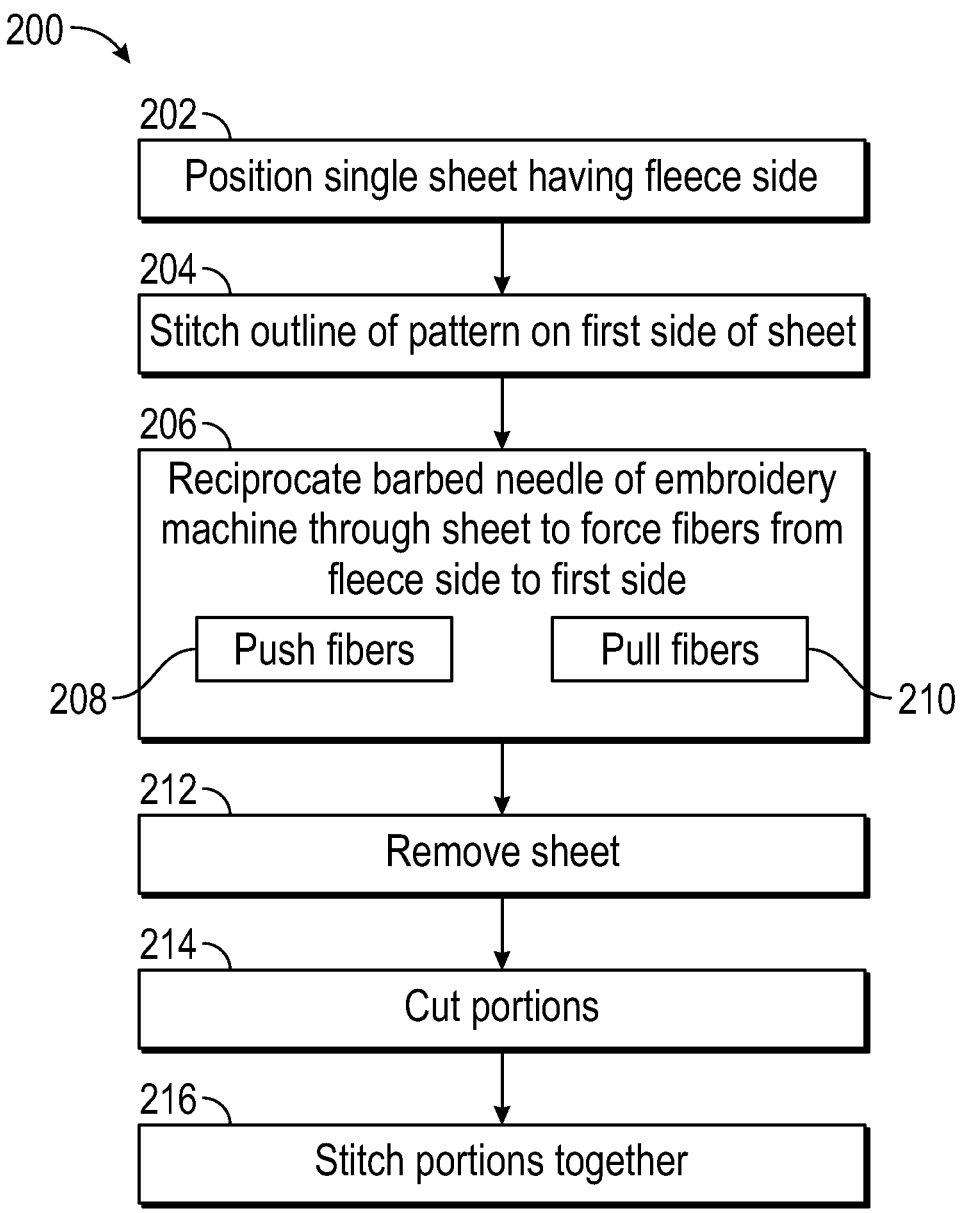
FIG. 9 is a flow diagram of an example method of manufacturing an article.
Figure 10:
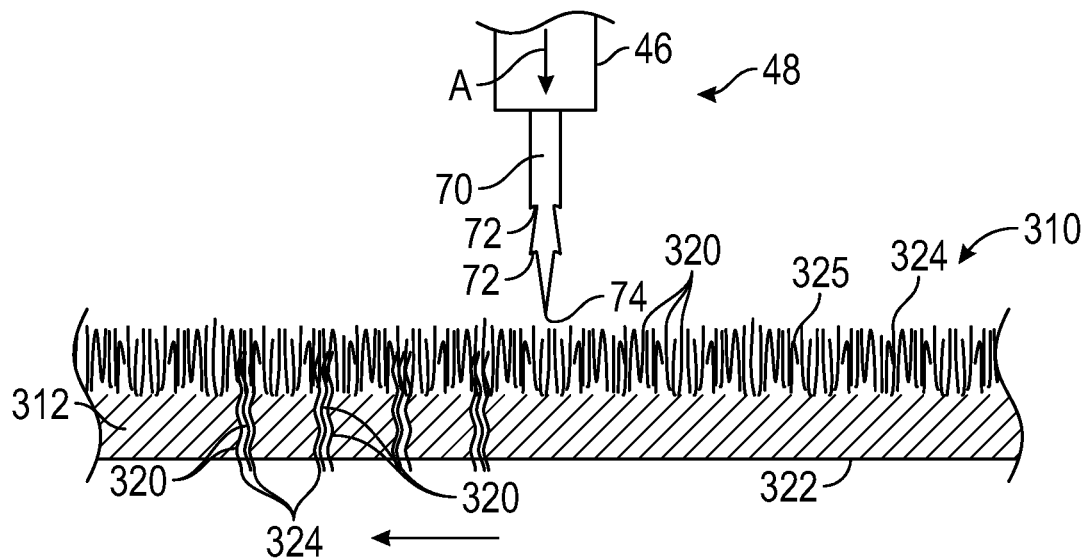
FIG. 10 is a fragmentary cross-sectional view of a single textile sheet at an intermediate stage of manufacture, illustrating the manufacturing of the article according to the method of FIG. 9.

FIG. 9 is a flow diagram of another example method of manufacturing 200 an article 310 shown in FIGS. 10-13. The article 310 includes only a single textile sheet 312. FIG. 10 is a fragmentary cross-sectional view of the single textile sheet 312 at an intermediate stage of manufacture, illustrating the manufacturing of the article 310 according to the method 200 of FIG. 9. The single textile sheet 312 has a first side 322 and a second side 325 opposite from the first side 322. In the embodiment shown, the second side 325 is a fleece side and is referred to as such. The first side 322 is relatively smooth prior to the method 200. The fleece side 325 has a plurality of relatively long fleece fibers 320 with terminal ends 324 that are all initially disposed on the fleece side 325. Either of the barbed needles 48, 48A are utilized to cause some of the fibers 320 to extend through the single textile sheet 312 in a predetermined pattern so that the terminal ends 324 of those particular fibers 20 are disposed outward of the exterior of the first side 322. Thus, a predetermined pattern on one side (e.g., the first side 322) and fleece on the opposite second side (e.g., the fleece side 325) are provided with a single textile sheet 312.

Figure 11:
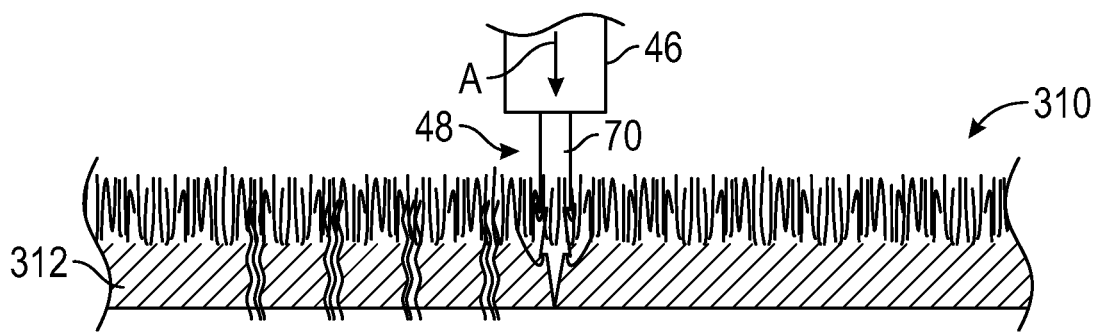
FIG. 11 is a fragmentary cross-sectional view of the single textile sheet of FIG. 10 at an intermediate stage of manufacture, illustrating a barbed needle of an embroidery machine pushing fibers at a fleece side of the single textile sheet through the single textile sheet to extend outward of an opposite side of the single textile sheet according to the method of FIG. 9.

In the embodiment shown in FIGS. 10 and 11, in which the barbed needle 48 is used, the method 200 begins with step 202, positioning the single textile sheet 312 with the fleece side 325 closest to the driven barbed needle 48. In the embodiment shown in FIGS. 12 and 13 in which the barbed needle 48A is used, step 202 includes positioning the single textile sheet with the first side 322 closest to the driven barbed needle 48A, and with the fleece side 325 furthest from the driven barbed needle 48A.

The method 200 may include step 204, stitching an outline of a predetermined pattern on the single textile sheet 312, such as the predetermined patterns P1, P2, P3 and P4 shown in FIG. 1. The stitches may be made by a threaded needle of the embroidery machine 44 other than the barbed needle 48 or 48A. In such example, step 204 occurs after step 202 and after the textile sheet 312 is disposed on the frame 58. Alternatively, the stitching of the outlines may be accomplished by a separate machine prior to disposing the textile sheet 312 on the frame 58 of the embroidery machine 44.

In some implementations, such as those in which the barbed needle 48A is used (with the barbs 72 extending away from the tip 74), step 204 occurs prior to reciprocating the barbed needle 48A, and reciprocating the barbed needle 48A may be done within the outline so that the fibers 320 of the fleece side 325 that are pulled through the single textile sheet 312 display the predetermined pattern on the first side 322. In either embodiment, the needle 48A or 48 may be moved under the control of the controller 50 according to a stored program 52 in the embroidery machine 44.

Next, the method 200 moves to step 206, reciprocating the barbed needle 48 (or 48A) of the embroidery machine 44 through the single textile sheet 312, the needle forcing fibers 320 of the fleece side 325 through the single textile sheet 312 to the first side 322. FIG. 11 is a fragmentary cross-sectional view of the textile sheet 312 of FIG. 10 at an intermediate stage of manufacture, illustrating the barbed needle 48 of the embroidery machine 44 pushing fibers 320 at the top side (e.g., the fleece side 325 through the textile sheet 312 to extend outward from the bottom side (e.g., the first side 322) of the textile sheet 312, according to the method 200 of FIG. 9. The fibers 320 may have terminal ends 324 extending outward of the first side 322 of the single textile sheet 312. The barbed needle 48 or 48A is unthreaded such that said reciprocating the barbed needle is without resulting stitching.

When the barbed needle 48 is used as in FIGS. 10 and 11, step 206 includes sub-step 208, as reciprocating the barbed needle 48 pushes the fibers 320 of the fleece side 325 through the single textile sheet 312 to the first side 322. When the barbed needle 48 moves in the direction of arrow A, the fibers are caught on the barbs 72 as shown in FIG. 11 and pushed to the side 322. When the barbed needle 48 moves in the direction opposite to direction A, the barbs 72 face away from the direction of movement and fibers 320 are generally not moved through the textile sheet 312 by the barbed needle 48.

Figure 12:
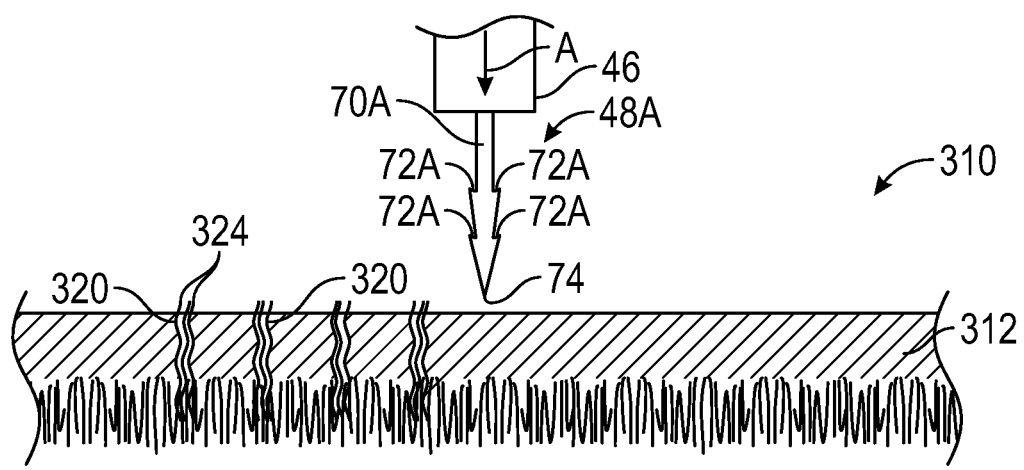
FIG. 12 is a fragmentary cross-sectional view of a single textile sheet at an intermediate stage of manufacture, illustrating the manufacturing of the article according to the method of FIG. 9.
Figure 13:
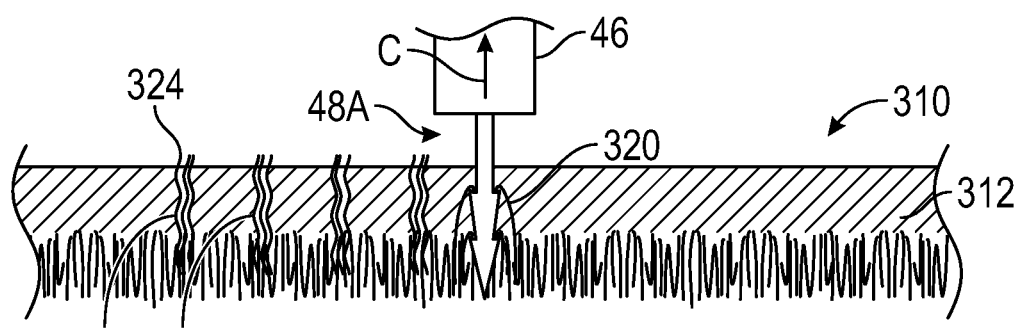
FIG. 13 is a fragmentary cross-sectional view of the single textile sheet of FIG. 12 at an intermediate stage of manufacture, illustrating a barbed needle of an embroidery machine pulling fibers at a fleece side of the single textile sheet through the single textile sheet to extend outward from an opposite side of the sheet according to the method of FIG. 9.

When the barbed needle 48A is used as in FIGS. 12 and 13, step 206 includes sub-step 210, as reciprocating the barbed needle 48A pulls fibers 320 of the fleeced side 325 through the single textile sheet 312 to the first side 322 as the fibers 320 are caught on the barbs 72A when the barbed needle moves in the direction of arrow C as shown in FIG. 13. When the barbed needle 48A moves in the direction of arrow A shown in FIG. 12, the barbs 72A face away from the direction of movement and fibers 320 are generally not moved through the textile sheet 312 by the needle 48A.

Following step 206, the method 200 may include step 212, removing the textile sheet 312 from the embroidery machine 44. Next, in step 214, portions can be cut out of the textile sheet 312, such as portions with shapes of the portions 28, 30, 32, and 34 of the two-sheet embodiment of FIG. 1. Finally, the portions may be stitched together in step 216 to form an article similar to article 10A but of only a single textile sheet, with the fleece side 325 as an inner side and the first side 322 with predetermined patterns formed of the fibers 320 at the exterior of the article.

Figure 18:
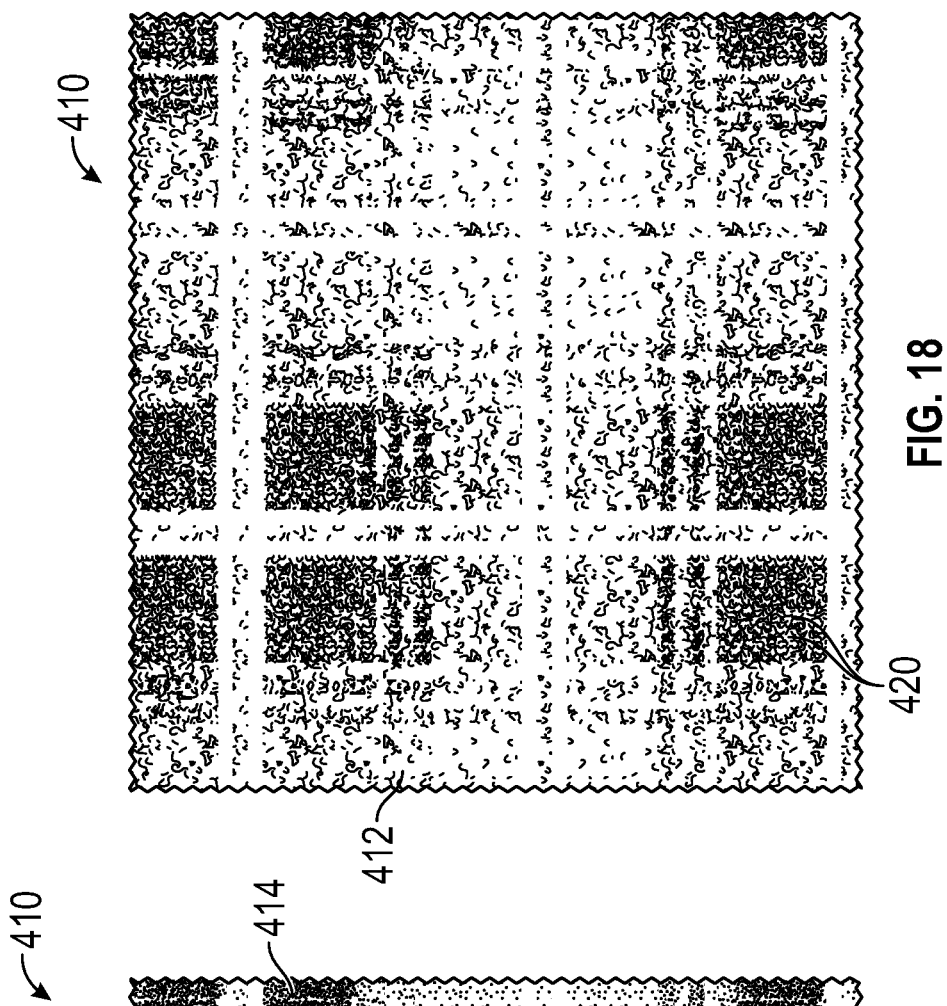
FIG. 18 is a plan view of a first textile sheet having fibers from the underlying second textile sheet of FIG. 17 extending through the first textile sheet in a plaid pattern.
Figure 17:
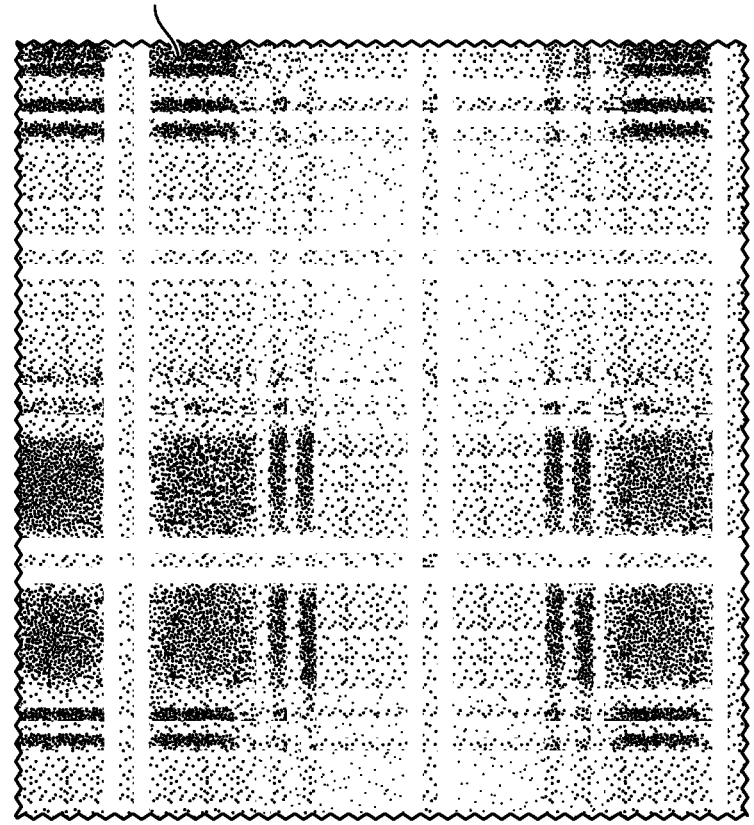
FIG. 17 is a plan view of a second textile sheet from which fibers extend through a first textile sheet of FIG. 18.

FIGS. 17 and 18 illustrate a two sheet embodiment of an article 410 manufactured according to the method 100. A textile sheet 414, referred to herein as a second textile sheet, is shown in FIG. 17 and includes fibers of multiple colors arranged in a plaid pattern. A textile sheet 412, referred to herein as a first textile sheet, is shown in FIG. 18 and is disposed back-to-back with the second sheet 414 (e.g., inner sides of the textile sheets 412, 414 are disposed against one another). The first textile sheet 412 may initially be a solid color, but fibers 420 from the second textile sheet 414 are forced through by the barbed needle 48 or 48A driven by the embroidery machine 44 (as shown with respect to textile sheets 12 and 14 in FIGS. 5-6 or FIGS. 7-8) to extend outward of an exterior side of the first textile sheet 412 in FIG. 18 to create the plaid pattern of fibers 420 shown on the first textile sheet 412.

Accordingly, various articles may be manufactured from one or more textile sheets such as footwear uppers, apparel, carry bags, etc. using a barbed needle driven by an embroidery machine to impart a predetermined pattern of fibers extending through the textile sheet (or sheets) in a desired predetermined pattern.

The following Clauses provide example configurations of an article and a method of manufacturing an article disclosed herein.

Clause 1. A method of manufacturing an article, the method comprising: positioning a first textile sheet against a second textile sheet; and reciprocating a single needle supported by a needle drive of an embroidery machine through the first textile sheet and the second textile sheet, the single needle forcing fibers of the second textile sheet through the first textile sheet so that the fibers are arranged in a predetermined pattern at the first textile sheet.

Clause 2. The method of manufacturing of clause 1, wherein the single needle has a notched shaft defining barbs extending toward a tip of the single needle and reciprocating the single needle pushes fibers of the second textile sheet through the first textile sheet.

Clause 3. The method of manufacturing of clause 1, wherein the single needle has a notched shaft defining barbs extending away from a tip of the single needle and reciprocating the single needle pulls fibers of the second textile sheet through the first textile sheet.

Clause 4. The method of manufacturing of clause 3, further comprising: prior to reciprocating the single needle, stitching an outline of the predetermined pattern on the first textile sheet; and wherein reciprocating the single needle is within the outline.

Clause 5. The method of manufacturing of any of clauses 1-4, wherein the single needle is unthreaded such that said reciprocating the single needle is without resulting stitching.

Clause 6. The method of manufacturing of any of clauses 1-5, wherein the fibers have terminal ends extending outward of an exterior side of the first textile sheet through which the fibers are forced.

Clause 7. A method of manufacturing an article, the method comprising: positioning a single textile sheet on an embroidery machine, the single textile sheet having a first side and a second side opposite from the first side; and reciprocating a single needle supported by a needle drive of an embroidery machine through the single textile sheet, the single needle forcing fibers of the second side through the single textile sheet to the first side so that the fibers are arranged in a predetermined pattern at the first side.

Clause 8. The method of manufacturing of clause 7, wherein the single needle has a notched shaft defining barbs extending toward a tip of the single needle and reciprocating the single needle pushes the fibers of the second side through the single textile sheet to the first side.

Clause 9. The method of manufacturing of clause 7, wherein the single needle has a notched shaft defining barbs extending away from a tip of the single needle and reciprocating the single needle pulls fibers of the second side through the single textile sheet to the first side.

Clause 10. The method of manufacturing of clause 9, further comprising: prior to reciprocating the single needle, stitching an outline of a pattern on the first side of the single textile sheet; and wherein reciprocating the single needle is within the outline so that the fibers of the fleece side pulled through the single textile sheet display the predetermined pattern on the first side.

Clause 11. The method of manufacturing of any of clauses 7-10, wherein the single needle is unthreaded such that said reciprocating the single needle is without resulting stitching.

Clause 12. The method of manufacturing of any of clauses 7-11, wherein the fibers have terminal ends extending outward of the first side of the single textile sheet.

Clause 13. The method of manufacturing of any of clauses 7-12, wherein the second side is fleece.

Clause 14. An article comprising: a textile sheet having fibers extending through the textile sheet from an interior side of the textile sheet to terminal ends disposed outward of an exterior side of the textile sheet opposite from the interior side, the fibers arranged in a pattern at least a portion of which has a width of about 0.5 millimeters.

Clause 15. The article of clause 14, wherein: the interior side of the textile sheet is a fleece side and the fibers are fleeced fibers of the textile sheet from the fleece side.

Clause 16. The article of clause 14, wherein the textile sheet is an exterior textile sheet, and the article further comprising: an interior textile sheet disposed against an interior side of the exterior textile sheet; and wherein the fibers are fibers from the interior textile sheet extending through the exterior textile sheet.

Clause 17. The article of clause 16, wherein the exterior textile sheet and the interior textile sheet are felt sheets.

Clause 18. The article of any of clauses 16-17, wherein the interior textile sheet has a plaid pattern and the fibers display the plaid pattern at an exterior side of the exterior textile sheet.

Clause 19. The article of any of clauses 13-18, wherein the article is a footwear upper.

Clause 20. The article of clause 19, wherein the footwear upper is an infant bootie.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical" refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the shoe is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the shoe in an assembled shoe. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method of manufacturing an article, the method comprising:
   positioning a first textile sheet against a second textile sheet;
   stitching an outline of a predetermined pattern on the first textile sheet using a threaded needle;
   after stitching the outline, controlling an embroidery machine such that the embroidery machine reciprocates a single unthreaded needle supported by a needle drive of the embroidery machine through the first textile sheet and the second textile sheet, wherein the reciprocating single unthreaded needle is within the outline and forces fibers of the second textile sheet through the first textile sheet so that the fibers of the second textile sheet are arranged in the predetermined pattern at the first textile sheet and have terminal ends extending outward of an exterior side of the first textile sheet through which the fibers of the second textile sheet are forced; and
   wherein the reciprocating single unthreaded needle does not create stitches.

2. The method of manufacturing of claim 1, wherein the reciprocating single unthreaded needle has a notched shaft defining barbs extending toward a tip of the reciprocating single unthreaded needle and the reciprocating single unthreaded needle pushes fibers of the second textile sheet through the first textile sheet.

3. The method of manufacturing of claim 1, wherein the reciprocating single unthreaded needle has a notched shaft defining barbs extending away from a tip of the reciprocating single unthreaded needle and the reciprocating single unthreaded needle pulls fibers of the second textile sheet through the first textile sheet.

4. The method of manufacturing of claim 1, further comprising:
   after controlling the embroidery machine such that the embroidery machine reciprocates the single unthreaded needle within the outline, cutting along or outside of the outline.

5. A method of manufacturing an article, the method comprising:
   positioning a first textile sheet against a second textile sheet; and
   controlling an embroidery machine such that the embroidery machine reciprocates a single unthreaded needle supported by a needle drive of the embroidery machine through the first textile sheet and the second textile sheet, the reciprocating single unthreaded needle forcing fibers of the second textile sheet through the first textile sheet so that the fibers are arranged in a predetermined pattern at the first textile sheet;

wherein the fibers have terminal ends extending outward of an exterior side of the first textile sheet through which the fibers are forced.

6. The method of manufacturing of claim 5, wherein the reciprocating single unthreaded needle has a notched shaft defining barbs extending toward a tip of the reciprocating single unthreaded needle and the reciprocating single unthreaded needle pushes fibers of the second textile sheet through the first textile sheet.

7. The method of manufacturing of claim 5, wherein the reciprocating single unthreaded needle has a notched shaft defining barbs extending away from a tip of the reciprocating single unthreaded needle and the reciprocating single unthreaded needle pulls fibers of the second textile sheet through the first textile sheet.

8. The method of manufacturing of claim 5, wherein the reciprocating single unthreaded needle does not create stitches.

9. The method of manufacturing of claim 5, wherein the fibers have terminal ends extending outward of an exterior side of the first textile sheet through which the fibers are forced.

\* \* \* \* \*